United States Patent
Baker et al.

(10) Patent No.: US 9,571,241 B2
(45) Date of Patent: Feb. 14, 2017

(54) METHODS FOR TRANSMITTING AND RECEIVING CONTROL INFORMATION USING TIME-FREQUENCY RESOURCES OF DECODING CANDIDATES

(75) Inventors: Matthew P. J. Baker, Canterbury (GB); Fang-Chen Cheng, Randolph, NJ (US); Sigen Ye, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 722 days.

(21) Appl. No.: 13/360,937

(22) Filed: Jan. 30, 2012

(65) Prior Publication Data
US 2013/0195068 A1 Aug. 1, 2013

(51) Int. Cl.
*H04L 5/00* (2006.01)

(52) U.S. Cl.
CPC ........... *H04L 5/0023* (2013.01); *H04L 5/0051* (2013.01); *H04L 5/0053* (2013.01)

(58) Field of Classification Search
CPC ...... H04L 5/0053; H04L 5/001; H04L 5/0048; H04L 5/0023; H04L 5/0007; H04L 5/0051; H04L 5/0094; H04L 5/0035; H04L 5/005; H04L 5/0057; H04L 1/1861; H04L 1/0027; H04L 1/0072; H04L 27/2613; H04W 72/042; H04W 72/1289; H04W 72/0406; H04W 72/048; H04W 72/0446; H04W 72/044; H04W 24/10; H04W 88/02; H04W 4/005; H04B 7/0413; H04B 7/024; H04B 7/0456; H04B 7/0689; H04B 7/02; H04B 7/0452; H04J 11/00; H04J 13/0003
See application file for complete search history.

(56) References Cited

U.S. PATENT DOCUMENTS

2003/0198326 A1 10/2003 Wei
2010/0165847 A1 7/2010 Kamuf et al.
(Continued)

FOREIGN PATENT DOCUMENTS

CN 102316595 A 1/2012
JP 2013-123139 A 6/2013
(Continued)

OTHER PUBLICATIONS

International Search Report and Written Opinion for corresponding International Patent Application No. PCT/US2013/023363 dated May 2, 2013.
NEC Group: "DM-RS antenna port association with ePDCCH transmission", 3GPP TSG RAN WG1 Meeting #69, R1-122594, May 12, 2012, Sections I-III.
Alcatel-Lucent et al., "Further details of ePDCCH UE-specific search space design", 3GPP TSG RAN WG1 Meeting #68, RI-120507, Feb. 1, 2012, Sections I-III.
Alcatel-Lucent Shanghai Bell et al., "Remaining Aspects of DMRS for ePDCCH", 3GPP TSG RAN WG1 Meeting #69, RI-122495, May 12, 2012, Sections I-III.
(Continued)

*Primary Examiner* — Yemane Mesfin
*Assistant Examiner* — Peter Chen
(74) *Attorney, Agent, or Firm* — Harness, Dickey & Pierce, P.L.C.

(57) ABSTRACT

In a method for receiving control information, a transceiver decodes at least one set of decoding candidates, and then detects whether control information is present on the control channel based on the decoded at least one set of decoding candidates. In a method for transmitting control information, a transceiver selects a decoding candidate from a set of decoding candidates for transmitting control information on a control channel; and transmits to another transceiver, control information using at least one time-frequency control channel resource element corresponding to the selected decoding candidate.

24 Claims, 8 Drawing Sheets

(56) References Cited

U.S. PATENT DOCUMENTS

| | | | |
|---|---|---|---|
| 2011/0085506 A1 | 4/2011 | Lee et al. | |
| 2011/0110316 A1 | 5/2011 | Chen et al. | |
| 2011/0111781 A1* | 5/2011 | Chen et al. | 455/507 |
| 2011/0249633 A1 | 10/2011 | Hong et al. | |
| 2011/0268062 A1 | 11/2011 | Ji et al. | |
| 2011/0274031 A1 | 11/2011 | Gaal et al. | |
| 2012/0063350 A1* | 3/2012 | Kim | H04L 5/0007 370/252 |
| 2013/0039291 A1* | 2/2013 | Blankenship | H04L 5/001 370/329 |
| 2013/0058285 A1* | 3/2013 | Koivisto et al. | 370/329 |
| 2013/0142142 A1* | 6/2013 | McBeath | H04W 72/042 370/329 |

FOREIGN PATENT DOCUMENTS

| | | |
|---|---|---|
| WO | WO-2010/127300 A2 | 11/2010 |
| WO | WO-2011/021852 A2 | 2/2011 |
| WO | WO-2011/140384 A2 | 11/2011 |
| WO | WO 2013/030793 | 3/2013 |

OTHER PUBLICATIONS

International Preliminary Report on Patentability issued in International Application No. PCT/US2013/023363, dated Aug. 14, 2014.
"Considerations on search space design for enhanced PDCCH", 3GPP TSG RAN WG1 Meeting #67, San Francisco, USA, Nov. 14-18, 2011, R1-113816.
"DM-RS Design for E-PDCCH in Rel-11", 3GPP TSG RAN WG1 Meeting #67, San Francisco, USA, Nov. 14-18, 2011, R1-114302.
"Search Space for ePDCCH", 3GPP TSG RAN WG1 Meeting #67, San Francisco, USA, Nov. 14-18, 2011, R1-114065.
"3rd Generation Partnership Project; Technical Specification Group Radio Access Network; Evolved Universal Terrestrial Radio Access (E-UTRA); Physical layer procedures (Release 10)", 3GPP TS 36.213 V10.4.0 (Dec. 2011) Technical Specification, Valbonne, France.
Yoshinori Tanaka, et al., "Downlink Control Channel Multiplexing in Evolved UTRA", Proceedings of the 2008 IEICE Society Conference, Sep. 2, 2008, S-35-S-3.
Japanese Office Action issued in Japanese Patent Application No. 2014-555601, issued Oct. 29, 2015.

* cited by examiner

METHODS FOR TRANSMITTING AND RECEIVING CONTROL INFORMATION USING TIME-FREQUENCY RESOURCES OF DECODING CANDIDATES

BACKGROUND OF THE INVENTION

In a $3^{rd}$ Generation Partnership Project (3GPP) Long-Term Evolution (LTE) wireless network, a control channel (e.g., a PDCCH) carries downlink control information (DCI) messages from an eNodeB to multiple user equipments (UEs). A DCI message intended for a particular UE includes information regarding, for example, resource allocation, transport format, and downlink shared channel (DL-SCH) hybrid automatic repeat request (ARQ). The DCI messages are part of control signaling enabling a UE to receive, demodulate and decode the DL-SCH.

SUMMARY OF THE INVENTION

At least one example embodiment provides a method including: decoding, at a transceiver, at least one set of decoding candidates, the set of decoding candidates being associated with at least one spatial layer within a three-dimensional search space for the transceiver, and each decoding candidate in the at least one set of decoding candidates including at least one time-frequency control channel resource element; and detecting, at the transceiver, whether control information is present on a control channel based on the decoded at least one set of decoding candidates.

At least one other example embodiment provides a method comprising: selecting, by a first transceiver, a decoding candidate from a set of decoding candidates for transmitting control information on a control channel, the set of decoding candidates being associated with at least one spatial layer within a three-dimensional search space for a second transceiver, and the selected decoding candidate including at least one time-frequency control channel resource element; and transmitting, from the first transceiver to the second transceiver, control information using the at least one time-frequency control channel resource element corresponding to the selected decoding candidate.

According to at least some example embodiments, at least two of the at least one set of decoding candidates may use at least partially overlapping time-frequency resources.

The at least one set of decoding candidates may include at least a first set of decoding candidates and at least a second set of decoding candidates, at least one decoding candidate in the first set of decoding candidates being identical in time and frequency to at least one decoding candidate in the second set of decoding candidates.

According to at least some example embodiments, the at least two of the at least one set of decoding candidates use identical time-frequency resources.

According to at least some example embodiments, at least two of the at least one set of decoding candidates use non-overlapping time-frequency resources.

At least one example embodiment provides a method for transmitting control information, the method including: selecting, by a first transceiver, a set of decoding candidates from among a plurality of sets of decoding candidates based on whether control information is to be transmitted with or without transmit diversity, the plurality of sets of decoding candidates including a first set of decoding candidates allocated for transmitting control information with transmit diversity and a second set of decoding candidates allocated for transmitting control information without transmit diversity, the first set of decoding candidates being associated with at least two spatial layers within a three-dimensional search space for a second transceiver and the second set of decoding candidates being associated with at least one spatial layer within a three-dimensional search space for the second transceiver, each decoding candidate in the first and second sets of decoding candidates including at least one time-frequency control channel resource element; selecting, by the first transceiver, a decoding candidate from the selected set of decoding candidates; and transmitting, from the first transceiver to the second transceiver, the control information using the at least one time-frequency control channel resource element of the selected decoding candidate.

At least one other example embodiment provides a transceiver configured to: decode at least one set of decoding candidates, each set of decoding candidates being associated with at least one spatial layer within a three-dimensional search space for the transceiver, and each decoding candidate in the at least one set of decoding candidates including at least one time-frequency control channel resource element; and detect whether control information is present on a control channel based on the decoded at least one set of decoding candidates.

At least one other example embodiment provides a transceiver configured to: select a decoding candidate from a set of decoding candidates for transmitting control information on a control channel, the set of decoding candidates being associated with at least one spatial layer within a three-dimensional search space for a second transceiver, and the selected decoding candidate in the set of decoding candidates including at least one time-frequency control channel resource element; and transmit, from the transceiver to the second transceiver, control information using at least one time-frequency control channel resource element corresponding to the selected decoding candidate.

At least one other example embodiment provides a transceiver configured to: select a set of decoding candidates from among a plurality of sets of decoding candidates based on whether control information is to be transmitted with or without transmit diversity, the plurality of sets of decoding candidates including a first set of decoding candidates allocated for transmitting control information with transmit diversity and a second set of decoding candidates allocated for transmitting control information without transmit diversity, the first set of decoding candidates being associated with at least two spatial layers within a three-dimensional search space for a second transceiver and the second set of decoding candidates being associated with at least one spatial layer within a three-dimensional search space for the second transceiver, each decoding candidate in the first and second sets of decoding candidates including at least one time-frequency control channel resource element; select a decoding candidate from the selected set of decoding candidates; and transmit, from the transceiver to the second transceiver, the control information using the at least one time-frequency control channel resource element of the selected decoding candidate.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
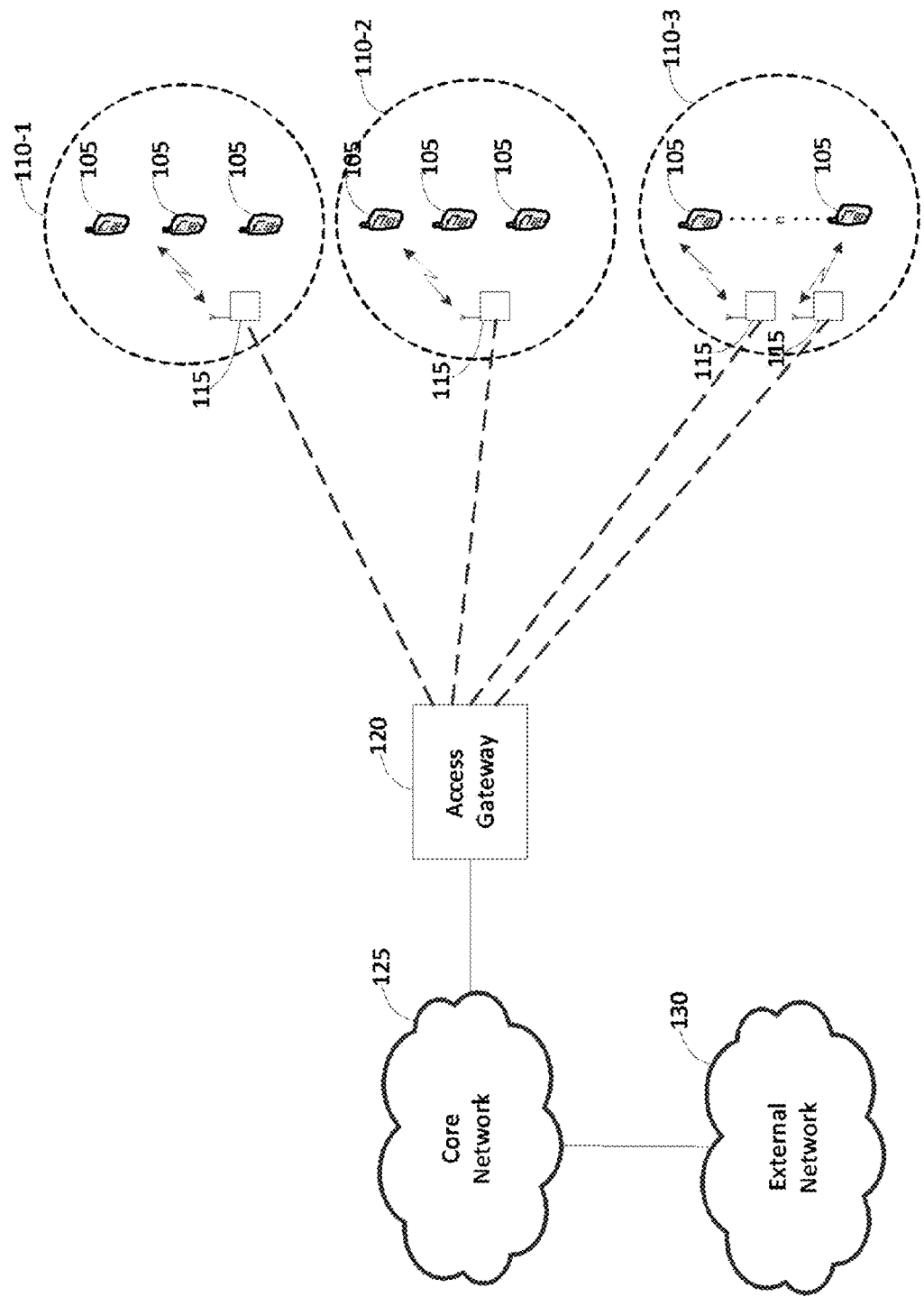
FIG. 1 illustrates an example wireless communication network.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 illustrates a wireless communication network 100 including an access gateway 120 communicatively coupled to one or more eNodeBs 115. The access gateway 120 is also communicatively coupled to a core network (CN) 125 that is, in turn, communicatively coupled to one or more external networks 130, such as the Internet and/or other circuit and/or packet data networks. Based on this arrangement, the network 100 communicatively couples user equipments (UEs) 105 to each other and/or to other user equipments or systems accessible via the external networks 130.

A more specific example of a wireless communication network 100 is an Evolved Universal Terrestrial Radio Access Network (E-UTRAN). For example purposes, the wireless network 100 will be described herein as an E-UTRAN. However, it should be understood that example embodiments may also be implemented in conjunction with other networks.

Referring to FIG. 1, the E-UTRAN 100 includes eNodeBs 115, which provide the Evolved Universal Terrestrial Radio Access (E-UTRA) user plane (PDCP/RLC/MAC/PHY) and control plane (RRC) protocol terminations with user equipments (UEs) 105. The eNodeBs 115 are interconnected with each other by an X2 interface.

As discussed herein, eNodeB 115 refers to a base station that provides radio access to UEs 115 within a given coverage area (e.g., 110-1, 110-2, 110-3). This coverage area is referred to as a cell. However, as is known, multiple cells are often associated with a single eNodeB.

Moreover, as used herein, the term "evolved Node B" or "eNodeB" may be considered synonymous to, and may hereafter be occasionally referred to, as a Node B, base station, base transceiver station (BTS), etc., and describes a transceiver in communication with and providing wireless resources to mobiles in a wireless communication network spanning multiple technology generations. As discussed herein, base stations may have all functionally associated with conventional, well-known base stations in addition to the capability to perform the methods discussed herein.

Moreover, as used herein, the term "mobile unit" may be considered synonymous to, and may hereafter be occasionally referred to, as a client, user equipment, mobile station, mobile user, mobile, subscriber, user, remote station, access terminal, receiver, etc., and describes a remote user of wireless resources in a wireless communication network.

Collectively, UEs and eNodeBs may be referred to herein as "transceivers" or "radio network elements."

The access gateway 120 is communicatively coupled to the eNodeBs 105. The access gateway 120 includes a logical entity that controls the eNodeBs 105 and coordinates multi-cell scheduling and transmission for eNodeBs 105 belonging to the same Multimedia Broadcast Single Frequency Network (MBSFN) area. For example, as is known, the access gateway 120 controls, inter alia, user radio access network (RAN) mobility management procedures and user session management procedures. More specifically, for example, the access gateway 120 controls a UEs tracking and reachability. The access gateway 120 also controls and executes transmission and/or retransmission of signaling messages such as paging messages for notifying destination UEs of impending connection requests (e.g., when UEs are being called or when network initiated data intended for the UE is coming).

Example embodiments will be discussed herein with regard to transmission of control information (e.g., downlink control information (DCI) messages) on the downlink (from eNodeB to UE). However, it should be understood that example embodiments may also be applicable to the same or similar transmissions on the uplink (from UE to eNodeB).

Release 11 of the 3rd Generation Partnership Project (3GPP) Long-Term Evolution (LTE) standards is to include a downlink control channel, known as the enhanced Physical Downlink Control Channel (ePDCCH).

The ePDCCH carries DCI messages from an eNodeB to one or multiple user equipments (UEs). The DCI messages may be transmitted on the ePDCCH using different time-frequency transmission resources and may also use different amounts of resources.

The basic unit of resource for a 3GPP LTE control channel such as the ePDCCH may be referred to as a control channel element (CCE). According to 3GPP LTE Releases 8-10, a CCE includes 36 resource elements (REs). However, a CCE for the ePDCCH may use any suitable different number of REs. Moreover, as discussed herein a CCE may also be referred to as a time-frequency control channel resource element.

The different amounts of time-frequency resources used for different DCI messages are generated by aggregating different numbers of CCEs (e.g., 1, 2, 4 or 8 CCEs). An aggregation level (e.g., 1, 2, 4, or 8) is an indication of the number of CCEs aggregated to generate the different amounts of resources used for transmitting different DCI messages.

In a given subframe, a UE expecting to receive DCI messages monitors one or more search spaces to ascertain whether the ePDCCH includes a DCI message intended for the UE. A UE may have a search space for each aggregation level, and each search space may include a plurality of decoding candidates. Each decoding candidate may include a plurality of CCEs and each CCE may include a plurality of REs.

For each decoding candidate in a search space, the UE performs a "blind decoding" and CRC check to determine whether the ePDCCH includes a DCI message for the UE. The use of CRC-scrambling according to a UE-specific identity (ID) prevents a UE from wrongly decoding a DCI message intended for another UE. Because methods for blind decoding and CRC checks are known, a detailed discussion is omitted.

The search space for the PDCCH in LTE Releases 8-10 is defined in terms of only time-frequency resources (in two-dimensions) in a subframe (which is a function of the UE ID), the number of decoding candidates per aggregation level, and the particular DCI format (e.g., number of information bits per DCI message) to be received. The total number of blind decodings is limited by UE capability and/or complexity. In LTE Releases 8-10, the total number of decoding candidates is set at 44 or 60 per carrier, depending on the UE capability.

To increase the capacity of the ePDCCH (e.g., a number of DCI messages per subframe) compared to the legacy PDCCH, the ePDCCH may include: the capability to utilize transmit diversity for DCI messages to some UEs, but not to others; the capability of utilizing multi-user multiple-input-multiple-output (MU-MIMO) on the ePDCCH; and the capability of utilizing single-user MIMO (SU-MIMO) on the ePDCCH. Multi-user MIMO capability allows for DCI messages being sent to different UEs to use the same time-frequency resources, but different antenna ports (also referred to as spatial layers). Single-user MIMO allows for multiple DCI messages being sent to the same UE to use the same time-frequency resources, but different antenna ports.

As is known, antenna ports are logical entities, which may not map 1:1 with physical antennas. Antenna ports are related to spatial layers. A spatial layer refers to a stream generated by spatial multiplexing. That is, for example, a layer may be described as a mapping of symbols onto transmit antenna ports.

According to at least some example embodiments, an ePDCCH search space for a given UE may be defined in frequency, time and spatial domains, and thus, be considered three-dimensional (3D). The addition of the spatial domain to the definition of a search space may be accomplished by using a number of antenna ports (or spatial layers).

For the sake of this discussion, it is assumed that the total size of the ePDCCH search space (e.g., the total size of the sets of decoding candidates) for a given UE is sub-divided into sets, which are referred to herein as "spatial sets." As discussed herein, a spatial set is a set of decoding candidates using a specific set of one or more antenna ports (or spatial layers) within the 3D search space, where the three dimensions are time, frequency and space.

Figure 2:
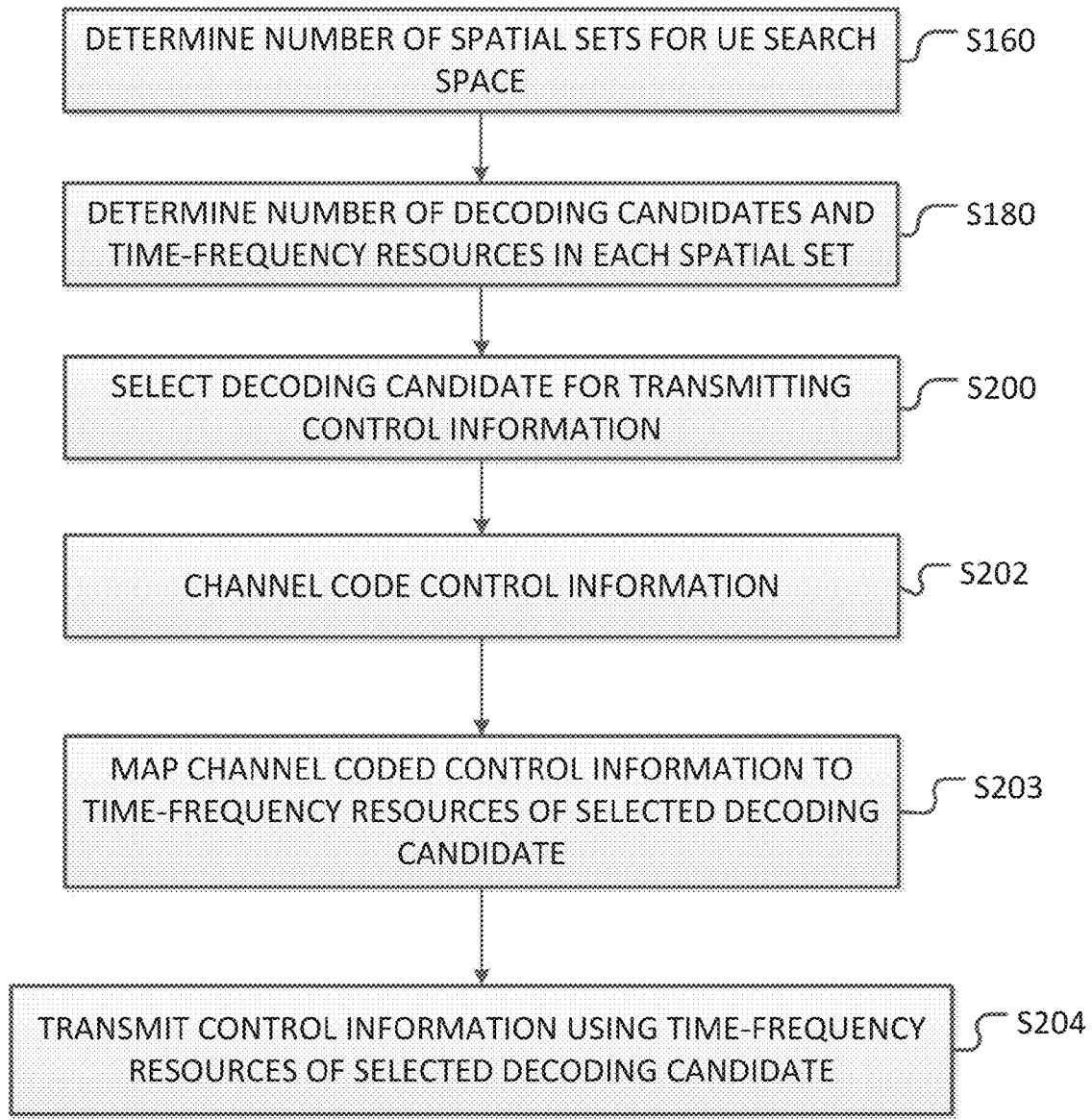
FIG. 2 is a flow chart illustrating a method for transmitting control information according to an example embodiment.

FIG. 2 is a flow chart illustrating a method for transmitting control channel information (e.g., DCI messages) according to an example embodiment. The method shown in FIG. 2 will be discussed with regard to transmission of control information from an eNodeB 115 to a single UE 105. However, it will be understood that each eNodeB 115 may perform similar operations/acts with regard to multiple UEs.

Referring to FIG. 2, at step S160, the eNodeB 115 determines the number of spatial sets in which to divide the search space for the UE 105. According to at least some example embodiments, the spatial dimension of a given UE's search space for the ePDCCH is configurable, but the total size (also referred to as the number of blind decodings) N of the UE's search space is independent of the spatial dimension of the search space. In one example, the total size of the UE's search space is given or predetermined based on UE capability.

The spatial dimension s of the 3D search space for a UE is configurable and determined according to Equation (1) shown below.

$$s = \frac{n_{ap}}{o_{txd}} \quad (1)$$

In Equation (1), $n_{ap}$ is the number of antenna ports (or spatial layers) used for the search space, and $O_{txd}$ refers to the transmit diversity order used for the ePDCCH for the UE.

According to at least some example embodiments, different spatial sets may have different diversity order values. So, one or more spatial layers may not utilize transmit diversity (have a diversity order of 1), whereas one or more other spatial layers may use transmit diversity (e.g., have a diversity order of 2).

Having determined the spatial dimension s of the search space for the UE 105, at step S180 the eNodeB 115 determines the number of decoding candidates $n_{dc}$ in each spatial set of the search space for the UE 105 according to Equation (2) shown below.

$$n_{dc} = \frac{N}{s} \quad \text{Equation (2)}$$

As mentioned above, N refers to the total size of the 3D search space for the UE 105, and s refers to the spatial dimension of the search space for the UE 105. Thus, according to at least some example embodiments, the search space for the UE 105 may include s spatial sets, where each spatial set includes $$\frac{N}{s}$$

decoding candidates.

Although example embodiments are discussed with regard to each spatial set including $$\frac{N}{s}$$

decoding candidates, one or more spatial sets within a UE's search space may have a different number of decoding candidates depending on, for example, the diversity order of a given spatial layer.

Still referring to step S180, the eNodeB 115 also determines the number of time-frequency resources (e.g., CCEs) to be included in each decoding candidate. The eNodeB 115 may determine the number of time-frequency resources in each decoding candidate using any conventional or known method. Because methods for doing so are known, a detailed discussion is omitted.

According to at least some example embodiments, separate control signaling to a UE (e.g., higher layer signaling) may be used to indicate one or more of N, s, $n_{ap}$, the identities of the relevant antenna ports, and $O_{txd}$, with any remaining unknown quantities being given or predetermined, for example, by specification, network operator, network controller, etc. With this information, the UE is also able to determine the number of spatial sets, the number of decoding candidates in each search space, and/or the number of time-frequency resources in each decoding candidate. Alternatively, these parameters may be given or predetermined by specification, network operator, network controller, etc. and known at both the eNodeB and the UE.

In a more specific example, if the total size N of the 3D search space for the UE 105 is 44, transmit diversity is not used for the ePDCCH ($O_{txd}=1$), and the number of antenna ports $n_{ap}$ is 4, then the spatial dimension (number of spatial sets)

$$s = \frac{4}{1} = 4$$

and the number of time-frequency decoding candidates in each spatial set is 11. These decoding candidates may be of a single aggregation level or spread across several aggregation levels. Moreover, the number of decoding candidates in each spatial set may average 11, but may be different for different spatial sets.

In another example, for a given UE, if the total size N of the 3D search space for the UE 105 is 44, two antenna ports are configured for transmit diversity ($O_{txd}=2$), and the number of antenna ports $n_{ap}$ to be considered by the UE is 4, then the spatial dimension $$s = \frac{4}{2} = 2.$$

In this case, the number of decoding candidates in each spatial set is 22. As with the previous example, the number of decoding candidates in each spatial set may average 22, but may be different for different spatial sets.

Referring back to FIG. 2, when the eNodeB 115 intends to send control information (e.g., DCI message(s)) to the UE 105, the eNodeB 115 selects a decoding candidate from a spatial set within the search space for the UE 105 at step S200. In one example, the eNodeB 115 selects a decoding candidate from a particular spatial set based on the radio frequency conditions for the UE 105 and/or coordination with other UEs (e.g., pairing with another UE to use MU-MIMO, or choosing a decoding candidate that is not used by other UEs).

After selecting the decoding candidate at step S200, the eNodeB 115 channel codes the control information at step S202. As is well-known, channel coding may include: cyclic redundancy check attachment, convolutional coding, and rate matching. As is also known, the manner in which the channel coding is performed depends on the chosen decoding candidate (e.g., the aggregation level of the selected decoding candidate).

At step S203, the eNodeB 115 maps the channel coded control information to the time-frequency resources (e.g., CCEs) in the selected decoding candidate according to the transport format of the ePDCCH.

The mapped channel coded control information is then scrambled, modulated, layer mapped, and precoded before being converted to complex modulated symbols for transmission. At step S204, the eNodeB 115 transmits the control information to the UE 105.

Figure 3:
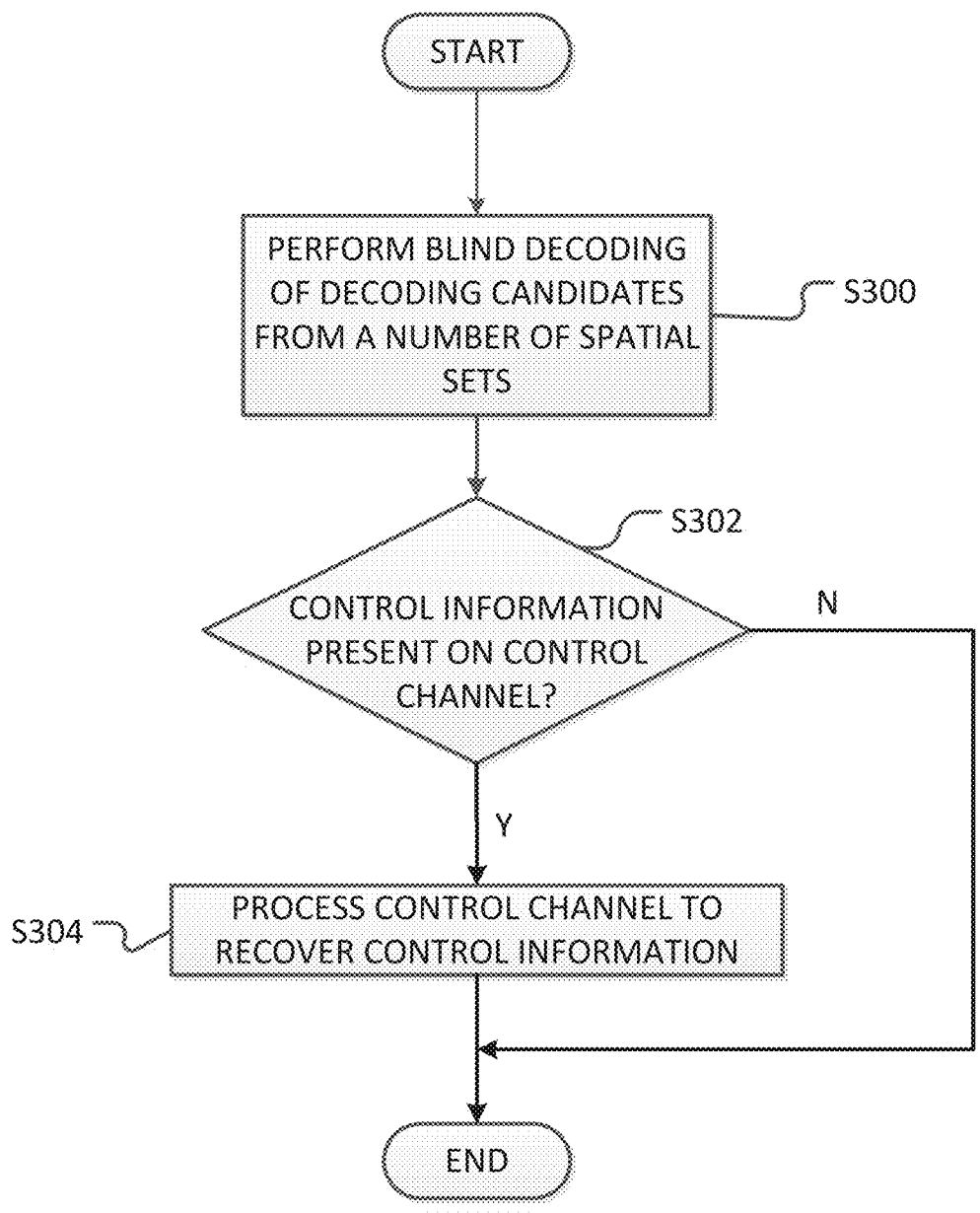
FIG. 3 is a flow chart illustrating a method for receiving control information according to an example embodiment.

FIG. 3 is a flow chart illustrating a method for receiving control information according to an example embodiment. The method shown in FIG. 3 will be described with regard to receipt, at the UE 105, of the control information transmitted by the eNodeB 115 as discussed above with regard to FIG. 2.

Referring to FIG. 3, after symbol combining, demodulation, and descrambling received symbols, the UE 105 performs blind decoding of the search space for the UE 105. That is, for example, the UE 105 performs blind decoding of decoding candidates from the spatial sets in the search space for the UE 105. As mentioned above, the search space for the UE 105 is known or determined at the UE 105.

At step S302, the UE 105 determines whether the control channel is carrying control information intended for the UE 105 based on the blindly decoded decoding candidates. If the UE 105 determines that control information intended for the UE 105 is not present on the control channel, then the process terminates.

Returning to step S302, if the UE 105 determines that control information intended for the UE 105 is present on the control channel, then the UE 105 processes the control channel to recover the transmitted control information at step S304. The UE 105 may process the control channel in any known manner. Because methods for recovering control channels such as the ePDCCH are known in the art, a detailed discussion is omitted for the sake of brevity.

The recovered control information is then used to receive and recover data transmitted on the DL-SCH. Because the manner in which this receipt and recovery is performed is known, a detailed discussion is omitted.

At least some example embodiments provide and utilize a 3D Control Channel Element (CCE), which includes time, frequency, and spatial resources. This enables control information to be transmitted using transmit diversity and/or spatial multiplexing; that is, control information is transmitted from two or more independent sources (e.g., antennas). Because transmit diversity and spatial multiplexing are known in the art, a detailed discussion is omitted.

According to at least some example embodiments, time-frequency resources of decoding candidates in two or more spatial sets may overlap.

In one example, if control information is transmitted on the ePDCCH without transmit diversity, then the $i^{th}$ spatial set in a UE's search space includes all decoding candidates using the $i^{th}$ antenna port (associated with the $i^{th}$ spatial layer), where $i=\{1, 2, \ldots 8\}$ In another example, if control information is transmitted on the ePDCCH with transmit diversity, then the $i^{th}$ spatial set includes all decoding candidates using the $j^{th}$ and $(j+1)^{th}$ antenna ports, where $j=\{1, 2, \ldots 8\}$. In this example, the $i^{th}$ spatial set includes decoding candidates associated with multiple antenna ports (or spatial layers).

The 3D search space for a given UE at an aggregation level a includes at least two spatial sets with non-overlapping, partially overlapping, or completely overlapping (identical) time-frequency resources.

When the 3D search space for a given UE includes at least two spatial sets with partially overlapping or identical time-frequency resources, the 3D search space is able to support both SU-MIMO and MU-MIMO operations of the ePDCCH.

If at least one decoding candidate in one of the spatial sets is identical in time and frequency to at least one decoding candidate in another spatial set within the UE's search space, then SU-MIMO operation is supported because SU-MIMO requires the existence of decoding candidates in the search space for a given UE, which use the same time-frequency resources in different spatial sets.

If decoding candidates of two or more UEs utilize overlapping time-frequency resources, but with different antenna ports, then MU-MIMO operation of the ePDCCH is supported because MU-MIMO requires the existence of decoding candidates in the search spaces for two or more UEs, which use the same time-frequency resources, but with different antenna ports.

According to at least some example embodiments, the defined 3D search space may be operated in SU-MIMO or MU-MIMO dynamically. The 3D search space is UE-specific and may be configured by the eNodeB based on UE capabilities.

According to at least some example embodiments, the degree of overlap (referred to below as β) or alternatively the size of the offset in time-frequency space from one spatial set to another, may be controlled and/or signaled by the network (e.g., determined by specification, network operator, network controller, etc.).

Figure 4:
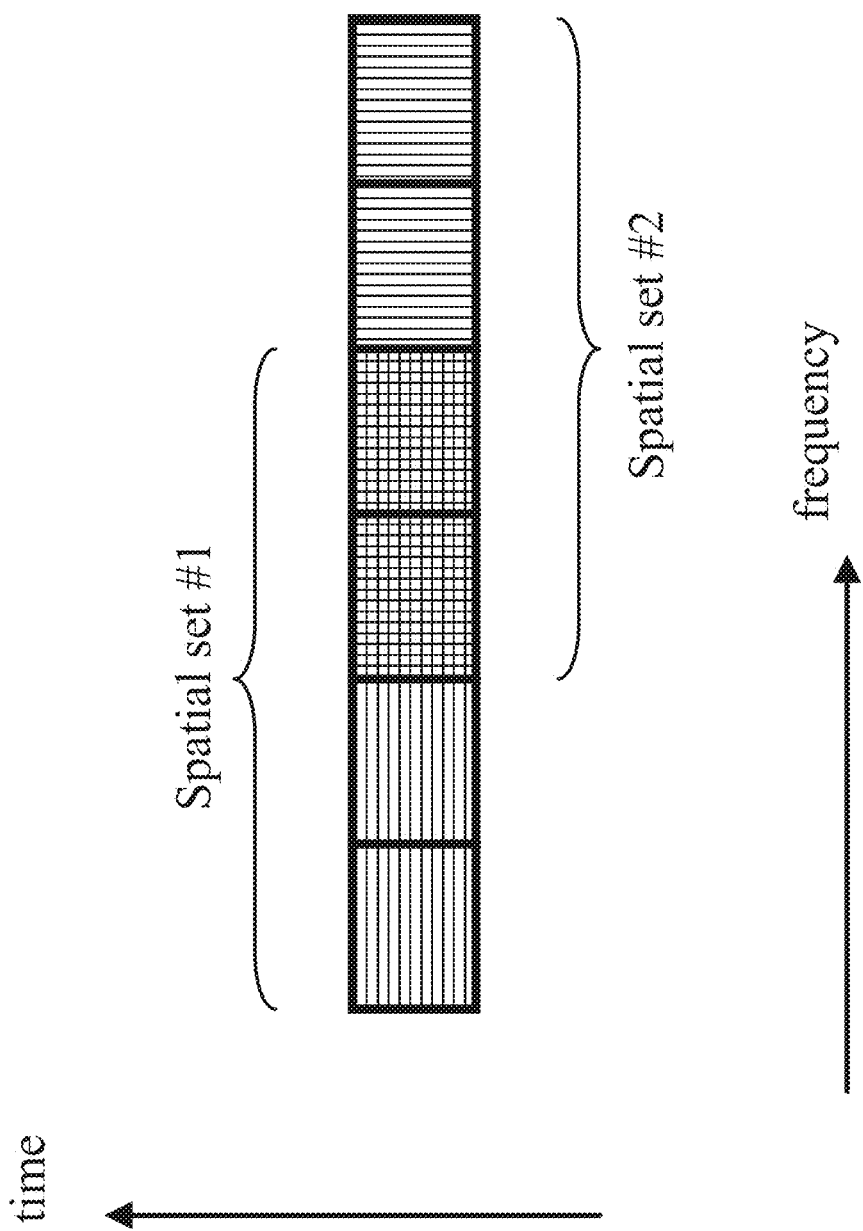
FIG. 4 shows an example of a three-dimensional (3D) search space.

FIG. 4 shows two example spatial sets including 3D CCEs. In this example, "spatial set #1" may correspond to antenna port #7 in a 3GPP LTE system, whereas "spatial set #2" may correspond to antenna port #8. In this case, each spatial set is associated with a different spatial layer or antenna port.

In another example, "spatial set #1" may correspond to antenna ports #7 and 8 using transmit diversity (e.g., space-frequency block coding (SFBC)), whereas "spatial set #2" may correspond to antenna ports #9 and 10 using transmit diversity. In this case, each spatial set is associated with two spatial layers, but the spatial layers associated with each spatial set are different.

According to at least some example embodiments, at least one decoding candidate in a first set of decoding candidates (e.g., spatial set #1) and at least one decoding candidate in a second set of decoding candidates (e.g., spatial set #2) at least partially overlap in time and frequency. In the example shown in FIG. 4, the time resources of spatial set #1 completely overlap the time resources of spatial set #2, whereas the frequency resources of spatial set #1 only partially overlap the frequency resources of spatial set #2.

Figure 8:
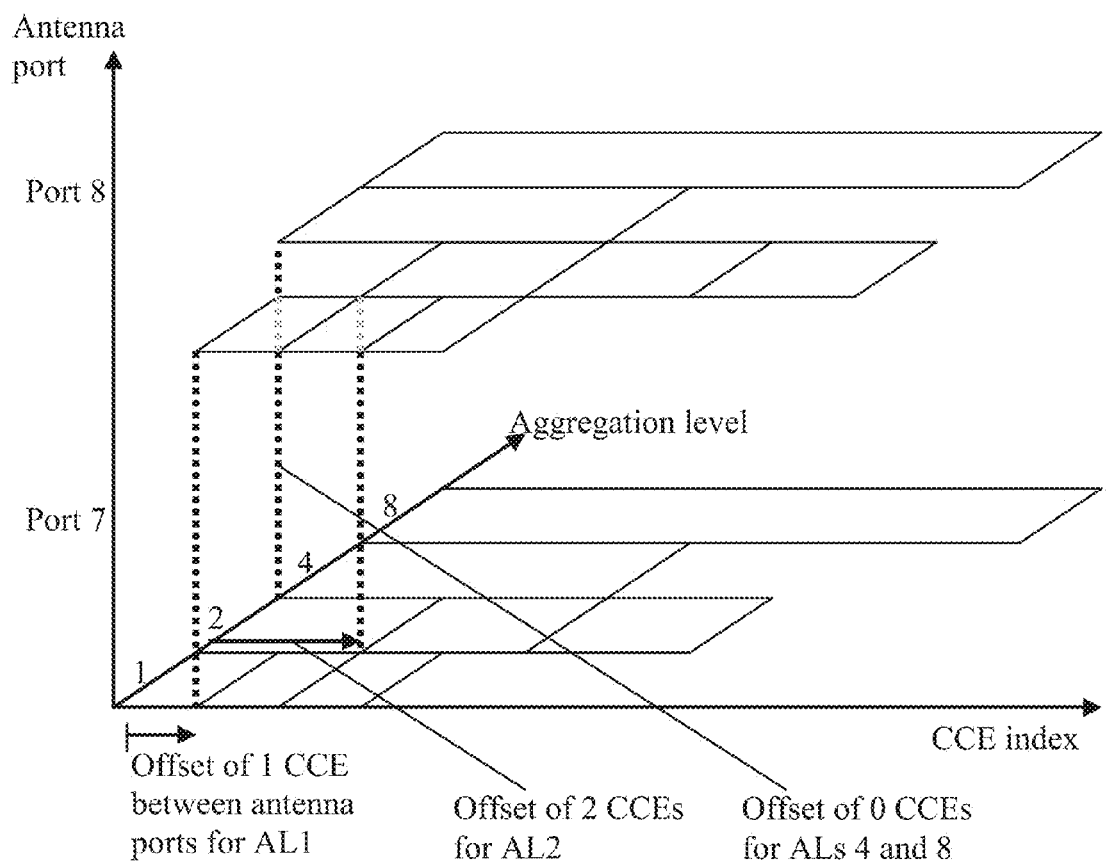
FIG. 8 shows example overlap or offsets between different aggregation levels.

According to at least some example embodiments, the size of the overlap or offset may be the same or different between the different aggregation levels if different aggregation levels are present. In this case, the size of the overlap or offset may be controlled and/or signaled by the network independently for each aggregation level. An example is shown in FIG. 8, in which the time-frequency dimensions are for the sake of clarity collapsed into a single axis in terms of CCE index. In FIG. 8, aggregation level 1 is referred to as AL1, aggregation level 2 is referred to as AL2, aggregation level 4 is referred to as AL4, and aggregation level 8 is referred to as AL8.

Although only two spatial sets are shown in FIG. 4, example embodiments may be implemented in conjunction with any suitable number of spatial sets (e.g., 2, 4, 8, etc.).

By utilizing 3D CCEs discussed above, an eNodeB may utilize transmit diversity when transmitting control information to UEs on a control channel such as the ePDCCH.

Figure 5:
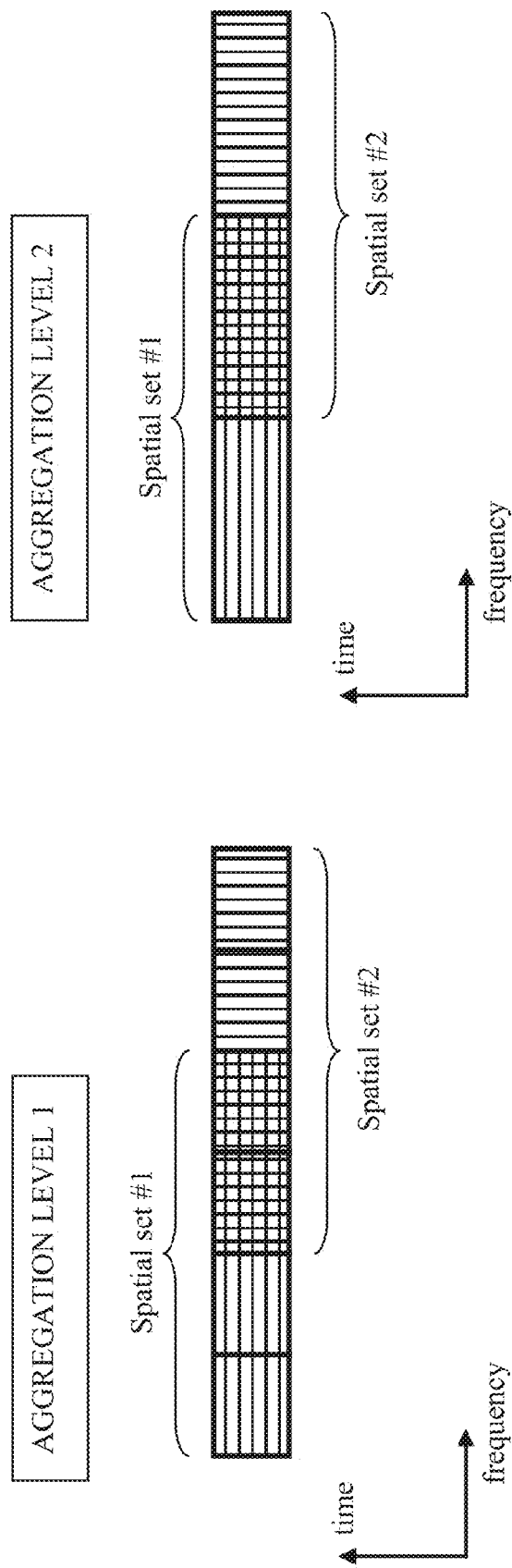
FIG. 5 shows example spatial sets for multiple aggregation levels.

FIG. 5 shows an example embodiment of spatial sets of 3D CCEs for multiple aggregation levels.

Referring to FIG. 5, the spatial sets for aggregation level 1 are the same as those shown in FIG. 4. For aggregation level 2, however, the 3D CCEs in each spatial set are aggregated, and the spatial sets overlap by only a single aggregated overlapping time-frequency resource.

According to at least some example embodiments, if there are $N_\alpha$ decoding candidates with aggregation level a in the 3D search space for a given UE, then there are s spatial sets in the UE-specific 3D search space. In at least one example embodiment, the total set of possible decoding candidates (at aggregation level a for a given UE) is ordered in time-frequency space according to a given, predetermined or specified rule using configurable parameters (e.g., according to a function of the UE ID), and the time-frequency resources (e.g., CCEs) for the decoding candidates of the $i^{th}$ spatial set are the first $$\frac{N_\alpha}{s}$$

resources beginning with, for example, the $$\left[(i-1)\left(\frac{N_\alpha \beta}{s}\right)+1\right]^{th}$$

resource according to the given, predetermined or specified rule.

For example, β=0.5 provides approximately 50% overlap between the time-frequency candidates of two adjacent spatial layers.

A value of β=0 results in total overlap between the time-frequency candidates of all the spatial layers (e.g., optimized for SU-MIMO operation).

A value of β>1.0 may reduce the overlap below 50%. When there is no overlap at all between the time-frequency candidates of the spatial sets, then only MU-MIMO, but not SU-MIMO, is supported.

According to at least some example embodiments, the value of β need not be signaled or known to the UE, provided that the starting point for the time-frequency resources of the candidates of each spatial set is known at the UE. Thus, the offset in time-frequency space between the different spatial sets may be different for each spatial set. The value of β or the starting point of each spatial set may be configured for each UE and delivered to the UE via higher-layer signaling, which is well-known in the art.

In at least one example embodiment, the total set of possible decoding candidates may be indexed cyclically. That is, for example, an offset which causes the indexing to overflow beyond the end of the total configured time-frequency space results in the indexing continuing at the start of the configured time-frequency space.

According to at least some example embodiments, each spatial set may include a different number of decoding candidates (e.g., the number of candidates with aggregation level a in the $i^{th}$ spatial set may be $N_{\alpha i}$.

Spatial sets using at least partially overlapping time and/or frequency resources may be utilized to transmit and/or receive control information on the ePDCCH as discussed above with regard to FIGS. 2 and 3.

According to at least some example embodiments, the eNodeB 115 may dynamically vary and/or change the overlap between decoding candidates within a search space on a per-subframe basis.

As mentioned above, to increase the capacity of the ePDCCH (e.g., number of DCI messages per subframe) compared to the legacy PDCCH, the ePDCCH may utilize transmit diversity (TxD) for DCI messages to some UEs, but not others. Conventionally, however, the configuration of using TxD or not using TxD is on a per configured ePDCCH resource set in a cell basis, meaning all the UEs within the configured ePDCCH resource set in a cell have the same configuration. Therefore, optimized dynamic switching between TxD and non-TxD for a given UE on the configured ePDCCH resource set according to prevailing radio propagation channel conditions is not possible.

Example embodiments provide for dynamic switching between the use of TxD transmissions and non-TxD transmissions on the ePDCCH.

According to at least this example embodiment, the ePDCCH search space for a given UE is subdivided into subsets, where one subset is allocated for ePDCCH messages using TxD, and another spatial subset is allocated for ePDCCH messages without TxD (non-TxD messages). For example, the eNodeB may choose to allocate half of the search space of a given UE to TxD messages and the other half to non-TxD messages.

By utilizing example embodiments, an eNodeB is able to dynamically switch between TxD and non-TxD transmissions on the ePDCCH for a given UE on a per subframe basis (e.g., from subframe to subframe), by selecting either a spatial set allocated for transmissions with TxD or a spatial set allocated for transmissions without TxD.

Figure 6:
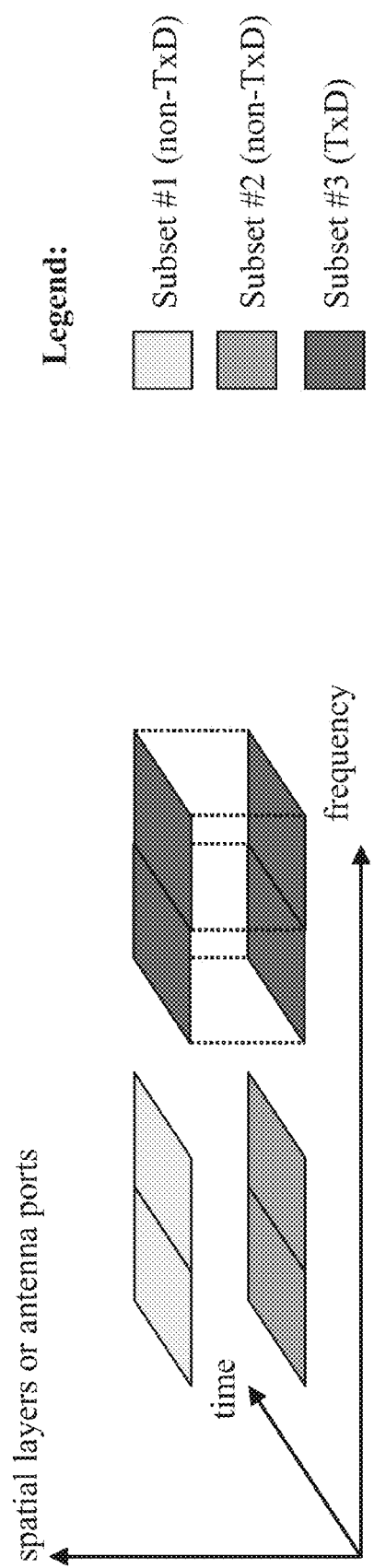
FIG. 6 shows a relatively simple example search space including decoding candidates allocated for transmissions with transmit diversity and transmissions without transmit diversity.

FIG. 6 shows a relatively simple example search space including decoding candidates allocated for transmissions with TxD (referred to as TxD transmissions) and decoding candidates for transmissions without TxD (referred to as non-TxD transmissions). In FIG. 6, Subset #1 and Subset #2 are allocated for non-TxD transmissions, whereas Subset #3 is allocated for TxD transmissions. In FIG. 6, each of Subset #1, Subset #2 and Subset #3 refers to a spatial set within a UE's search space.

According to at least some example embodiments, different subsets of the search space may be interleaved in the time-frequency space. And, each subset in the search space may include one or more aggregation levels.

Figure 7:
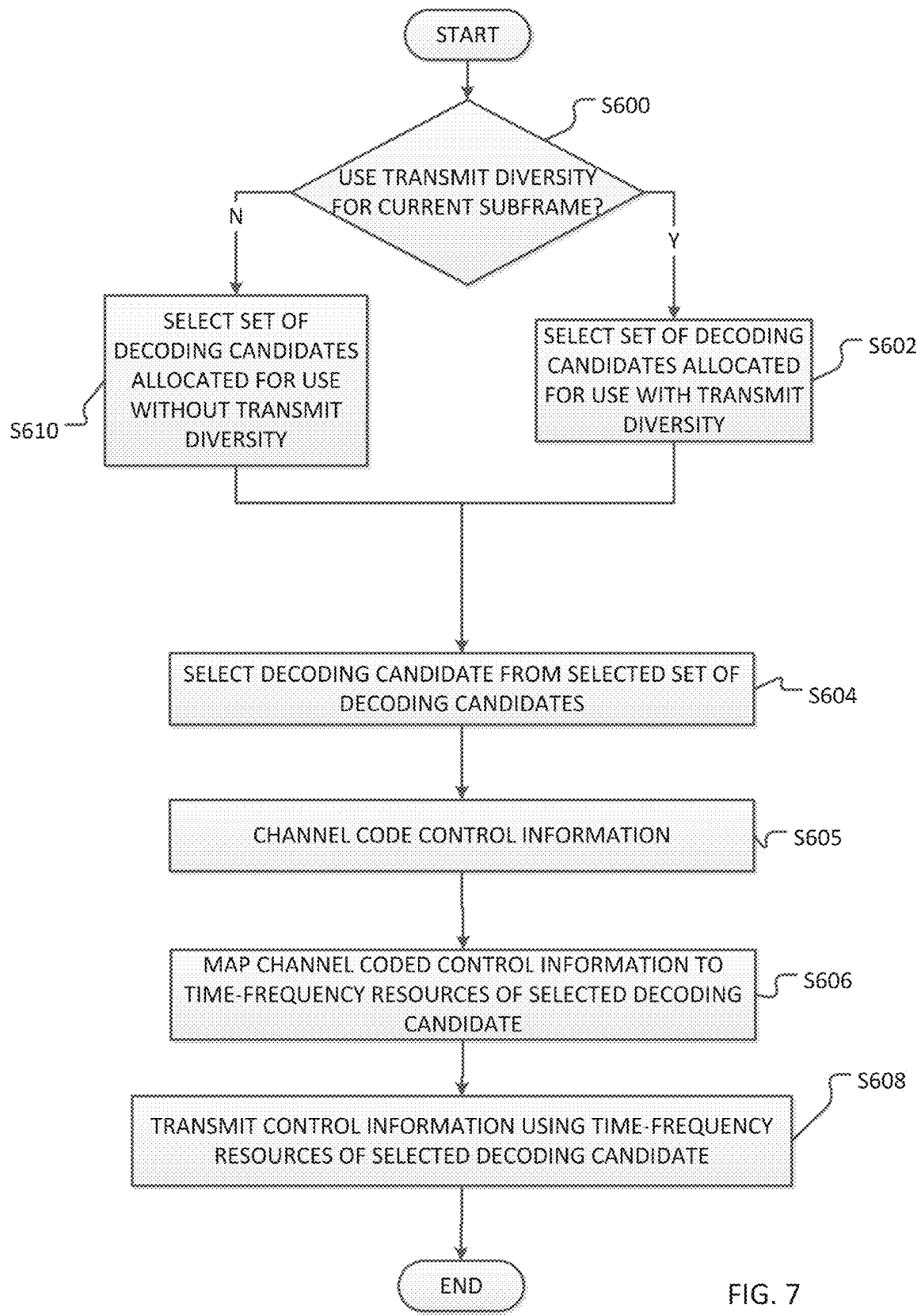
FIG. 7 is a flow chart illustrating a method for transmitting control information according to another example embodiment.

FIG. 7 is a flow chart illustrating a method for transmitting control information according to another example embodiment. The method shown in FIG. 7 is an example embodiment in which an eNodeB dynamically switches between TxD and non-TxD transmissions of control information between subframes on a control channel such as the ePDCCH.

Referring to FIG. 7, at step S600, the eNodeB 115 determines whether TxD is necessary for transmitting control information. The eNodeB 115 may determine whether TxD is necessary according to prevailing radio propagation channel conditions at the time the control information is to be transmitted. For example, when the propagation loss is high or fading is severe, the eNodeB 115 may choose to use TxD.

If the eNodeB 115 decides to use TxD for transmitting control information on the control channel in the current subframe, then at step S602 the eNodeB 115 selects a set of decoding candidates allocated for transmission of control information with TxD.

At step S604, the eNodeB 115 selects a decoding candidate from the selected set of decoding candidates allocated for transmission with TxD in the same or a similar manner to that discussed above with regard to step S200 in FIG. 2.

At step S605, the eNodeB 115 channel codes the control information in the same or a similar manner to that discussed above with regard to step S202 in FIG. 2.

At step S606, the eNodeB 115 maps the channel coded control information to the CCEs in the selected decoding candidate according to the transport format of the ePDCCH as described above with regard to S203 in FIG. 2. The mapped channel coded control information is then scrambled, modulated, layer mapped, and precoded before being converted to complex modulated symbols for transmission.

At step S608, the eNodeB 115 transmits the control information to the UE 105 as described above with regard to step S204 in FIG. 2.

Returning to step S600, if the eNodeB 115 decides that the use of TxD for transmitting control information on the control channel in the current subframe is not necessary, then the eNodeB 115 selects a set of decoding candidates allocated for transmission of control information without TxD at step S610.

The process then proceeds as discussed above with regard to steps S604, S605, S606 and S608.

At least the example embodiment discussed above with regard to FIGS. 6 and 7 provides a methodology to incorporate both transmit diversity and non-transmit diversity operation in the search space of a control channel, such as the ePDCCH.

The invention being thus described, it will be obvious that the same may be varied in many ways. Such variations are not to be regarded as a departure from the invention, and all such modifications are intended to be included within the scope of the invention.

We claim:

1. A method performed at a radio access network node, the method comprising:
   decoding, at a transceiver, at least one set of decoding candidates, each set of decoding candidates being associated with at least one spatial layer within a UE-specific search space for the transceiver, and each decoding candidate in the at least one set of decoding candidates including at least one time-frequency control channel resource element, the UE-specific search space being a three-dimensional search space for a control channel; and
   detecting, at the transceiver, whether control information is present on the control channel based on the decoded at least one set of decoding candidates; wherein
   a spatial dimension of the UE-specific search space is determined based on a number of spatial layers associated with the UE-specific search space and a transmit diversity order for the at least one set of decoding candidates.

2. The method of claim 1, wherein the three-dimensional search space includes a time dimension, a frequency dimension and a spatial dimension.

3. The method of claim 1, further comprising:
   determining a number of decoding candidates in each of the at least one set of decoding candidates based on a total size of the UE-specific search space for the transceiver and the spatial dimension of the UE-specific search space for the transceiver.

4. The method of claim 1, wherein the number of spatial layers corresponds to a number of antenna ports associated with the UE-specific search space.

5. The method of claim 3, wherein the number of spatial layers corresponds to a number of antenna ports associated with the UE-specific search space.

6. The method of claim 3, wherein the at least one set of decoding candidates includes at least two sets of decoding candidates, the at least two sets of decoding candidates including a different number of decoding candidates.

7. The method of claim 1, wherein a number of decoding candidates in the at least one set of decoding candidates is determined based on the number of spatial layers associated with the UE-specific search space and the transmit diversity order for the at least one set of decoding candidates.

8. The method of claim 7, wherein a total size of the UE-specific search space is independent of the number of spatial layers associated with the UE-specific search space.

9. The method of claim 8, wherein a number of decoding candidates in the at least one set of decoding candidates is reduced when the number of spatial layers associated with the UE-specific search space is increased.

10. The method of claim 7, wherein the number of spatial layers corresponds to a number of antenna ports associated with the UE-specific search space.

11. The method of claim 1, wherein the at least one set of decoding candidates includes at least two sets of decoding candidates, each of the at least two sets of decoding candidates using at least partially overlapping time-frequency resources.

12. The method of claim 11, wherein a size of the overlap between time-frequency resources is controlled independently for each aggregation level.

13. The method of claim 1, wherein the at least one set of decoding candidates includes at least a first set of decoding candidates and at least a second set of decoding candidates, at least one decoding candidate in the first set of decoding candidates being identical in time and frequency to at least one decoding candidate in the second set of decoding candidates.

14. The method of claim 1, wherein the at least one set of decoding candidates includes at least two sets of decoding candidates, each of the at least two sets of decoding candidates using identical time-frequency resources.

15. The method of claim 1, wherein the at least one set of decoding candidates includes at least two sets of decoding candidates, each of the at least two sets of decoding candidates using non-overlapping time-frequency resources.

16. The method of claim 1, wherein the at least one set of decoding candidates includes at least a first set of decoding candidates and at least a second set of decoding candidates, the first set of decoding candidates being associated with at least a first antenna port, and the second set of decoding candidates being associated with at least a second antenna port.

17. The method of claim 1, wherein the at least one set of decoding candidates includes at least a first set of decoding candidates and at least a second set of decoding candidates, at least the first set of decoding candidates being allocated for transmitting control information with transmit diversity, and at least the second set of decoding candidates being allocated for transmitting control information without transmit diversity.

18. A method performed at a radio access network node, the method comprising:
selecting, by a first transceiver, a decoding candidate from a set of decoding candidates for transmitting control information on a control channel, the set of decoding candidates being associated with at least one spatial layer within a UE-specific search space for a second transceiver, and the selected decoding candidate in the set of decoding candidates including at least one time-frequency control channel resource element, the UE-specific search space being a three-dimensional search space for the control channel; and
transmitting, from the first transceiver to the second transceiver, control information using the at least one time-frequency control channel resource element corresponding to the selected decoding candidate; wherein
a spatial dimension of the UE-specific search space is determined based on a number of spatial layers associated with the UE-specific search space and a transmit diversity order for the set of decoding candidates.

19. The method of claim 18, further comprising:
signaling, to the second transceiver, at least one of a total size of the UE-specific search space, the spatial dimension of the UE-specific search space, a number of antenna ports associated with the UE-specific search space, identifies of the antenna ports, and the transmit diversity order.

20. A method performed at a radio access network node, the method comprising:
selecting, by a first transceiver, a set of decoding candidates from among a plurality of sets of decoding candidates based on whether control information is to be transmitted with or without transmit diversity, the plurality of sets of decoding candidates including a first set of decoding candidates allocated for transmitting control information with transmit diversity and a second set of decoding candidates allocated for transmitting control information without transmit diversity, the first set of decoding candidates being associated with at least two spatial layers within a UE-specific search space for a second transceiver and the second set of decoding candidates being associated with at least one spatial layer within the UE-specific search space for the second transceiver, each decoding candidate in the first and second sets of decoding candidates including at least one time-frequency control channel resource element, the UE-specific search space being a three-dimensional search space for a control channel;
selecting, by the first transceiver, a decoding candidate from the selected set of decoding candidates; and
transmitting, from the first transceiver to the second transceiver, the control information using the at least one time-frequency control channel resource element of the selected decoding candidate; wherein
a spatial dimension of the UE-specific search space is determined based on a number of spatial layers associated with the UE-specific search space and a transmit diversity order for the selected set of decoding candidates.

21. The method of claim 20, further comprising:
dynamically switching between transmission of control information with transmit diversity and without transmit diversity by selecting one of the first set of decoding candidates and the second set of decoding candidates on a per subframe basis.

22. A radio access network node comprising:
a transceiver configured to decode at least one set of decoding candidates, each set of decoding candidates being associated with at least one spatial layer within a UE-specific search space for the transceiver, and each decoding candidate in the at least one set of decoding candidates including at least one time-frequency control channel resource element, the transceiver being further configured to detect whether control information is present on a control channel based on the decoded at least one set of decoding candidates; wherein
the UE-specific search space is a three-dimensional search space for the control channel, and
a spatial dimension of the UE-specific search space is determined based on a number of spatial layers associated with the UE-specific search space and a transmit diversity order for the at least one set of decoding candidates.

23. A radio access network node comprising:
a transceiver configured to select a decoding candidate from a set of decoding candidates for transmitting control information on a control channel, the set of decoding candidates being associated with at least one spatial layer within a UE-specific search space for a second transceiver, and the selected decoding candidate in the set of decoding candidates including at least one time-frequency control channel resource element, the transceiver being further configured to transmit, from the transceiver to the second transceiver, control information using the at least one time-frequency control channel resource element corresponding to the selected decoding candidate; wherein the UE-specific search space is a three-dimensional search space for the control channel, and a spatial dimension of the UE-specific search space is determined based on a number of spatial layers associated with the UE-specific search space and a transmit diversity order for the set of decoding candidates.

24. A radio access network node comprising:

a transceiver configured to select a set of decoding candidates from among a plurality of sets of decoding candidates based on whether control information is to be transmitted with or without transmit diversity, the plurality of sets of decoding candidates including a first set of decoding candidates allocated for transmitting control information with transmit diversity and a second set of decoding candidates allocated for transmitting control information without transmit diversity, the first set of decoding candidates being associated with at least two spatial layers within a UE-specific search space for a second transceiver and the second set of decoding candidates being associated with at least one spatial layer within the UE-specific search space for the second transceiver, each decoding candidate in the first and second sets of decoding candidates including at least one time-frequency control channel resource element, the transceiver being further configured to select a decoding candidate from the selected set of decoding candidates, and transmit, from the transceiver to the second transceiver, the control information using the at least one time-frequency control channel resource element of the selected decoding candidate; wherein the UE-specific search space is a three-dimensional search space for a control channel, and a spatial dimension of the UE-specific search space is determined based on a number of spatial layers associated with the UE-specific search space and a transmit diversity order for the selected set of decoding candidates.

\* \* \* \* \*